United States Patent
Brown

(10) Patent No.: US 12,435,708 B2
(45) Date of Patent: Oct. 7, 2025

(54) SMA ACTUATION APPARATUS

(71) Applicant: CAMBRIDGE MECHATRONICS LIMITED, Cambridge (GB)

(72) Inventor: Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/292,793

(22) PCT Filed: Jul. 27, 2022

(86) PCT No.: PCT/GB2022/051969
§ 371 (c)(1),
(2) Date: Jan. 26, 2024

(87) PCT Pub. No.: WO2023/007157
PCT Pub. Date: Feb. 2, 2023

(65) Prior Publication Data
US 2024/0337255 A1 Oct. 10, 2024

(30) Foreign Application Priority Data
Jul. 27, 2021 (GB) ................................. 2110788

(51) Int. Cl.
*G02B 27/00* (2006.01)
*F03G 7/06* (2006.01)
(Continued)

(52) U.S. Cl.
CPC ....... *F03G 7/06143* (2021.08); *G02B 27/646* (2013.01); *G03B 5/00* (2013.01);
(Continued)

(58) Field of Classification Search
CPC .............................. G02B 27/646; G03B 5/00; G03B 2205/0007; G03B 2205/0076; F03G 7/06143
See application file for complete search history.

(56) References Cited

U.S. PATENT DOCUMENTS

2009/0295986 A1* 12/2009 Topliss ................... G02B 7/026
396/73
2011/0249131 A1* 10/2011 Topliss ..................... G03B 5/00
348/208.7
(Continued)

FOREIGN PATENT DOCUMENTS

WO 2020/074900 A1 4/2020

OTHER PUBLICATIONS

Great Britain Search Report and Written Opinion received for GB Application No. 2110788.3, mailed on Jan. 11, 2022, 6 pages.
(Continued)

*Primary Examiner* — Shafiq Mian
(74) *Attorney, Agent, or Firm* — Van Hoven PC; Stefan D. Osterbur; Joshua Van Hoven

(57) ABSTRACT

An SMA actuation apparatus (1) comprising: a plurality of SMA wires (71-78) arranged, on contraction, to (a) tilt a movable part (100) relative to a support structure (3) about a first axis (x) and (b) translationally move the movable part relative to the support structure perpendicular to a primary axis (P); and a control circuit electrically connected to the SMA wires for supplying drive signals thereto, and configured to generate drive signals that combine the tilting and the translational movement to cause the movable element to tilt about a second axis (y) that is perpendicular to the primary axis and spaced from the first axis.

21 Claims, 5 Drawing Sheets

(51) Int. Cl.
    *G02B 27/64*    (2006.01)
    *G03B 5/00*     (2021.01)
(52) U.S. Cl.
    CPC ............... *G03B 2205/0007* (2013.01); *G03B 2205/0076* (2013.01)

(56)  References Cited

U.S. PATENT DOCUMENTS

2019/0372667 A1    12/2019    Momtahan et al.
2021/0207587 A1     7/2021    Miller et al.
2021/0348714 A1*   11/2021    Burbridge ............ G02B 27/646

OTHER PUBLICATIONS

International Search Report and Written Opinion received for PCT Patent Application No. PCT/GB2022/051969, mailed on Sep. 2, 2022, 9 pages.

\* cited by examiner

SMA ACTUATION APPARATUS

CROSS-REFERENCE TO RELATED APPLICATIONS

This application is a national stage application under 35 U.S.C. § 371 of International Application No. PCT/GB2022/051969, filed Jul. 27, 2022, which claims priority of GB Patent Application No. 2110788.3, filed Jul. 27, 2021, the disclosures of each of which are hereby incorporated by reference herein in their entireties.

FIELD

The present application relates to an actuation apparatus, particularly an actuation apparatus comprising a plurality of lengths of shape-memory alloy (SMA) wire.

BACKGROUND

Such an actuation apparatus may be used, for example, in a camera to move a lens assembly in directions perpendicular to the optical axis so as to provide optical image stabilization (OIS). Where such a camera is to be incorporated into a portable electronic device such as a mobile telephone, miniaturization can be important.

WO 2011/104518 A1 discloses an SMA actuation apparatus that uses SMA actuator wires to move a movable element (for example, a camera module comprising an image sensor and a lens assembly) relative to a support structure to provide, for example, OIS by lateral movement or tilting of the movable element relative to the support structure.

The actuation apparatus may comprise a component connected to the camera unit that resists motion of the camera module because the component is stiff. For example, electrical connections from the tilting camera to the stationary portion may provide resistance to some of the desired movements of the camera module. This can make it difficult to control the movement of the camera module. The present invention is concerned with making movement of the camera module easier to control.

SUMMARY OF INVENTION

According to a first aspect of the present invention, there is provided an SMA actuation apparatus comprising: a movable part: a support structure; a plurality of SMA wires; and a control circuit. The plurality of SMA wires are arranged, on contraction, to (a) tilt the movable part relative to the support structure about at least one first axis that is perpendicular to a primary axis and that passes through the movable part, and (b) translationally move the movable part relative to the support structure perpendicular to the primary axis, wherein the primary axis is defined with reference to the support structure. The control circuit is electrically connected to the SMA wires for supplying drive signals thereto. The control circuit is configured to generate drive signals that combine the tilting and the translational movement so as to cause the movable element to tilt about at least one second axis that is perpendicular to the primary axis and spaced from the at least one first axis.

By combining the tilting and the translational movement so as to cause the movable element to tilt about at least one second axis that is perpendicular to the primary axis and spaced from the first axis, the axis of rotation can be moved. This makes it possible for the axis of rotation to be closer to the natural axis of rotation of the stiff component, thereby reducing undesirable resistance caused by the stiff component. This makes it easier to control the movement of the movable part.

In some embodiments, the movable part is a camera module comprising an image sensor and, optionally, a lens assembly (e.g. comprising a camera lens element) arranged (e.g. above the image sensor with respect to the primary axis) to focus an image on the image sensor. In alternative embodiments, the SMA actuation apparatus is a camera apparatus further comprising an image sensor fixed to the support structure, and the movable part comprises a lens assembly (e.g. comprising a camera lens element) arranged to focus an image on the image sensor. By moving the axis of rotation for tilt, the movement of the movable part can be controlled more easily.

In some embodiments, the movable part comprises a display or an emitter, the primary axis is parallel to a general direction in which the display or emitter emits light.

In some embodiments, the SMA actuation apparatus comprises a component connected at one end to the movable part and passing between the movable part and the support structure, below the movable part with respect to the primary axis.

The component may extend from the movable part in a first direction and then bend around to extend in a second direction which is at least substantially opposite (e.g. opposite or generally opposite) to the first direction.

The component may be a stiff component, an interconnect, a flexible component, a flexible connector, a flexible circuit, a flexible printed circuit (FPC), a flat flexible cable (FFC) and/or a flat flexible connector.

The component may be for making electrical connections to the movable part, or an electronic component forming part of the movable part which may be, for example, an image sensor, a display (or a part thereof), an emitter (or a part thereof).

In some embodiments, the control circuit is configured to generate the drive signals such that the at least one second axis intersects with the primary axis at a position within the axial extent of the component along the primary axis.

In some embodiments, the component has a centre of stiffness and the control circuit is configured to generate the drive signals such that the at least one second axis intersects with the primary axis at an axial position of the centre of stiffness of the component along the primary axis. By moving the axis of rotation to overlap with the component, the axis of rotation is brought closer to the natural axis of rotation of the component such that the resistance to rotation caused by the component is reduced.

In some embodiments, the control circuit is configured to generate the drive signals such that the at least one second axis intersects with the primary axis at a position beyond (or substantially beyond) the axial extent of where the SMA wires are attached to the movable part along the primary axis, at least when the movable part is in its neutral or untilted position with respect to the support structure. In some embodiments, the control circuit is configured to generate the drive signals such that the at least one second axis intersects with the primary axis at a position beyond (or substantially beyond) the axial extent of the movable part along the primary axis, at least when the movable part is in its neutral or untilted position with respect to the support structure. By moving the axis of rotation to beyond the crimping positions or the movable part, rotations are enabled over a wider range of axial positions.

In some embodiments, the SMA actuation apparatus is configured such that: the movable part can tilt relative to the support structure about the at least one first axis between tilt limits defining maximum tilt angles about the at least one first axis; and the movable part can tilt relative to the support structure about the at least one second axis between tilt limits defining the same maximum tilt angles about the at least one second axis. This allows the full rotation capability of the actuator to be realised. The maximum tilt angles may be at least 1°, at least 2°, at least 5° or at least 10° in both directions of tilt.

In some embodiments, the control circuit is configured to generate the drive signals so as to control a position at which the at least one second axis intersects with the primary axis during use of the SMA actuation apparatus. This allows the position of the axis to be moved during use of the actuation apparatus. Accordingly, it is easier to compensate for the fact that in practice the height of the natural axis of rotation of a stiff component may change with the angle of the moving part, and may vary from one axis to another within a single part.

In some embodiments, the plurality of SMA wires comprises one or more first pairs of SMA wires in which the two SMA wires are oppositely inclined with respect to the primary axis and are arranged such that an imaginary point of intersection between imaginary linear continuations of the two SMA wires beyond where they are attached to the movable part along a projection perpendicular to the primary axis is beyond (or substantially beyond) the axial extent of the two SMA wires along the primary axis, at least when the movable part is in its neutral or untilted position with respect to the support structure. The imaginary point of intersection may be beyond (or substantially beyond) the axial extent of the movable part along the primary axis, at least when the movable part is in its neutral or untilted position with respect to the support structure. The imaginary point of intersection may be within the axial extent of the component along the primary axis. The component may be between the movable part and the imaginary point of intersection along the primary axis. The imaginary point of intersection may be beyond (or substantially beyond) the axial extent of all of the SMA wires along the primary axis, at least when the movable part is in its neutral or untilted position with respect to the support structure.

In some embodiments, the plurality of SMA wires comprises one or more second pairs of SMA wires in which the two SMA wires are oppositely inclined with respect to the primary axis and are arranged such that an imaginary point of intersection between imaginary linear continuations of the two SMA wires beyond where they are attached to the support structure along a projection perpendicular to the primary axis is beyond (or substantially beyond) the axial extent of the two SMA wires along the primary axis, at least when the movable part is in its neutral or untilted position with respect to the support structure.

In some embodiments, the plurality of SMA wires comprises one or more third pairs of SMA wires in which the two SMA wires are oppositely inclined with respect to the primary axis and are arranged such that a point of intersection between lines along which the two SMA wires lie along a projection perpendicular to the primary axis is within (or just outside, as in slightly or inconsiderably or marginally outside) the axial extent of the two SMA wires along the primary axis, at least when the movable part is in its neutral or untilted position with respect to the support structure; the point of intersection being at the opposite axial end of the movable part along the primary axis relative to the imaginary point associated with the one or more first pairs of SMA wires. In order to enable rotation around axes lying in the plane in which the stiff component sits and to enable the full rotation capability of the actuator to be realised, the wires may not extend to the corners. The axis of rotation can lie on any plane over an axial range. This enables rotations about the interconnect to be accommodated by the design while still achieving the full tilt allowed by the wires. The moving ends of the wires may not extend to the corners so that the moving portion is able to tilt without going below the level of the stiff component and without increasing the height of the actuator too much.

In some embodiments, the SMA wires are attached to the support structure at positions that are beyond (or substantially beyond) the axial extent of the movable part along the primary axis, at least when the movable part is in its neutral or untilted position with respect to the support structure.

In some embodiments, the control circuit is configured to generate the drive signals to control the tilt angle of the movable part about the at least one second axis based on a calculation of the current tilt angle and a target tilt angle.

In some embodiments, the control circuit is configured to generate the drive signals to control the tilt angle and the lateral position of the movable part based on a calculation of the current tilt angle, a calculation of the current lateral position, a target tilt angle and a target lateral position. The position and orientation of the movable part can be tightly controlled.

In some alternative embodiments, the control circuit is configured to generate the drive signals to control the tilt angle of the movable part based on a calculation of the current tilt angle and a target tilt angle, while allowing the lateral position of the movable part to be passively determined. In this way the height of the axis of rotation can be controlled while still maintaining accurate control of the angle through which the movable part has rotated.

In some embodiments, the plurality of SMA wires comprises eight SMA actuator wires inclined with respect to the primary axis with two SMA actuator wires on each of four sides around the primary axis. In some embodiments, on each side the two SMA actuator wires are inclined in opposite senses with respect to each other and cross.

In some embodiments, the movable part is supported on the support structure solely by the SMA actuator wires. In some embodiments, the movable part comprises a lens assembly (or a camera lens element) that includes one or more lenses having a diameter of at most 20 mm.

In some embodiments, the at least one first axis comprises two first orthogonal axes that are perpendicular to the primary axis. In some embodiments, the at least one second axis comprises two second orthogonal axes that are perpendicular to the primary axis. The tilt about two orthogonal axes can be controlled more easily.

The various features of the aspects of the present invention set out above may be applied equally to other aspects of the present invention.

BRIEF DESCRIPTION OF THE DRAWINGS

To allow better understanding, embodiments of the present invention will now be described by way of non-limitative example with reference to the accompanying drawings, in which.

DETAILED DESCRIPTION

Figure 1:
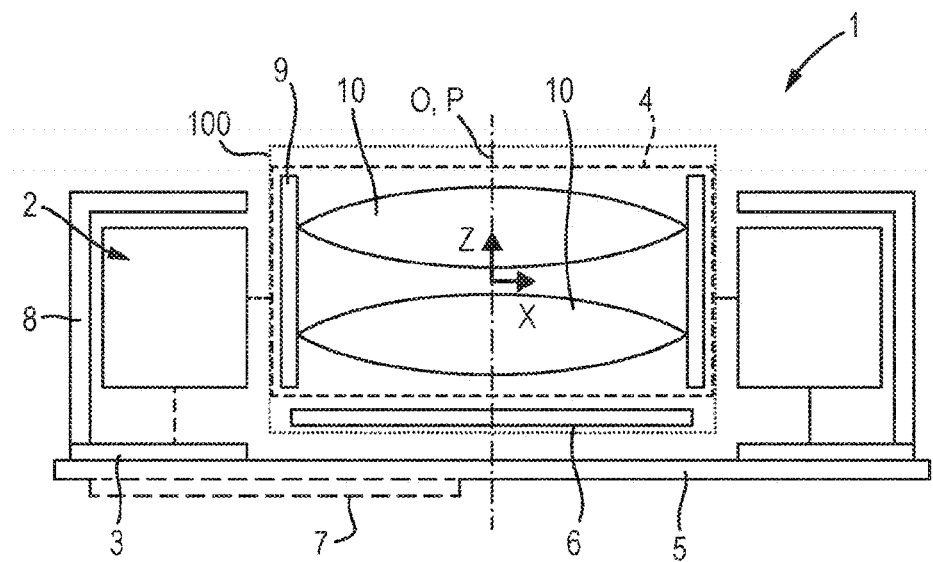
FIG. 1 is a schematic diagram of an SMA actuation apparatus.

FIG. 1 is a schematic diagram of a SMA actuation apparatus 1. The SMA actuation apparatus 1 includes a movable part 100 and a support structure 3. The support structure 3 includes a base 5. The movable part 100 may be a camera module 100 comprising a lens assembly 4 and an image sensor 6. The movable part 100 may be suspended on the support structure 3 by a SMA actuator 2 comprising SMA wires. The image sensor 6 is disposed in front of a front side of the base 5, i.e., the image sensor 6 is interposed between the lens assembly 4 and the base 5. The lens assembly 4 is positioned above the image sensor 6 with respect to a primary axis P of the camera assembly 1. The primary axis P is defined with reference to the support structure 3. The primary axis P may be perpendicular to the major surfaces of the base 5 and may pass through the centre of the support structure 3, the centre of an aperture of the can 8 and/or the centre of the SMA actuation apparatus 1.

The SMA actuator 2 supports the movable part 100 in a manner allowing one or more degrees-of-freedom of the movable part 100 relative to the support structure 3. The lens assembly 4 has an optical axis O. As shown in FIG. 1, the optical axis O is aligned with the primary axis P when the movable part 100 is in its neutral position in which the image sensor 6 is substantially parallel to the base 5 (i.e. when the movable part 100 is in the untilted position with respect to the support structure 3) and the movable part 100 is laterally centred between the SMA actuator assembly 2.

The SMA actuation apparatus 1 includes an integrated circuit (IC) 7, which implements a control circuit, and also a gyroscope sensor (not shown). The support structure 3 also includes a can 8 which protrudes forwardly from the base 5 to encase and protect the other components of the SMA actuation apparatus 1.

The lens assembly 4 includes a lens carriage 9 in the form of a cylindrical body supporting two lenses 10 arranged along the optical axis O. In general, any number of one or more lenses 10 may be included. Each lens 10 may have a diameter of up to about 20 mm. The SMA actuation apparatus 1 may be comprised in a camera, which may be referred to as a miniature camera.

The lens assembly 4 is arranged to focus an image onto the image sensor 6. The image sensor 6 captures the image and may be of any suitable type, for example, a charge-coupled device (CCD) or a complementary metal-oxide-semiconductor (CMOS) device.

Although all the lenses 10 are fixed to the lens carriage 9 in this example, the lens carriage 9 may include an actuator assembly (not shown) configured to move at least one of the lenses 10 along the optical axis O relative to the image sensor 6, for example to provide autofocusing (AF) or zoom. Such an actuator is also referred to as an AF actuator and may be an SMA actuator comprising SMA wires, a voice coil motor (VCM) actuator, or any other suitable type of actuator.

In general, one or more SMA wires are arranged, on contraction, to tilt the movable part 100 relative to the support structure 3 about two orthogonal axes that are perpendicular about the primary axis P of the SMA actuation apparatus 1. For example, if a set of right-handed orthogonal axes x, y, z is aligned so that a third axis z is aligned with the primary axis P, the one or more SMA wires are arranged, on contraction, to tilt the movable part 100 relative to the support structure 3 about axes parallel to the x and y axes.

OIS functionality may be provided by tilting the lens assembly 4 and the image sensor 6 about an axis parallel to the first axis x and/or about an axis parallel to the second y axis. This is used to provide OIS, compensating for movement of the SMA actuation apparatus 1, which may be caused by hand shake etc. Additionally, as discussed above, the lens assembly 4, or at least one lens 10 thereof, may be moved parallel to the optical axis O (parallel to the third axis z) to provide focusing of an image formed on the image sensor 6, for example as part of an automatic focusing (AF) function.

This specification is concerned with examples of SMA actuation apparatuses 1 which provide OIS that is based on tilting the lens assembly 4 and the image sensor 6 relative to the support structure 3. AF may be provided by an additional system which may or may not use SMA wires.

Figure 2:
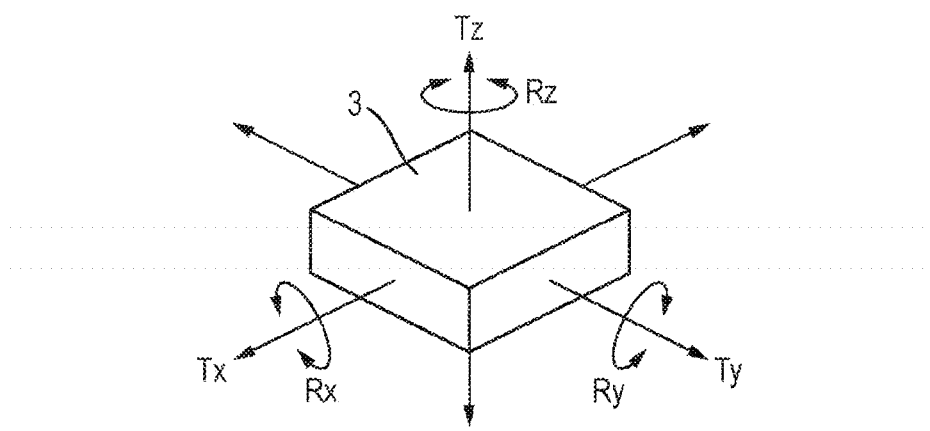
FIG. 2 schematically illustrates possible degrees of freedom which may be provided by an SMA actuation apparatus.

Referring also to FIG. 2, possible types of movement (or degrees of freedom) which may be provided in an SMA actuation apparatus 1 are illustrated.

A first degree-of-freedom (DOF) Tx corresponds to movement parallel to the first axis x. A second DOF Ty corresponds to movement parallel to the second axis y. A third DOF Tz corresponds to movement parallel to the third axis z, which is aligned with the primary axis P. The third DOF Tz corresponds to movement of the lens assembly 4 and the image sensor 6 towards or away from the base 5. The first, second and third axes x, y, z form a right-handed Cartesian coordinate system. A fourth DOF Rx corresponds to rotation about an axis parallel to the first axis x. A fifth DOF Ry corresponds to rotation about an axis parallel to the second axis y. A sixth DOF Rz corresponds to rotation about an axis parallel to the third axis z.

Motions of the movable part 100 relative to the support structure 3 may be broken down into components of any or all of the first to sixth DOF (movements) Tx, Ty, Tz. Rx, Ry, Rz. Although described as degrees-of-freedom, in some cases translations and rotations may be linked. For example, a given translation Tz along the third axis z may be tied to a corresponding rotation Rz so that motion of the lens assembly 4 is helical.

This specification concerns SMA actuation apparatuses 1 which provide the motions corresponding to at least one of the fourth and fifth DOF Rx, Ry in addition to at least of the first and second DOF Tx, Ty. The fourth and fifth DOF Rx, Ry provide the OIS functionality herein. Other motions may be constrained by the SMA actuation apparatuses 1.

The plurality of SMA wires of the SMA actuator 2 are arranged, on contraction, to tilt the movable part 100 relative to the support structure 3 about at least one first axis that is perpendicular to a primary axis P of the SMA actuation apparatus 1 and that passes through the movable part 100.

The first axis may be the x axis or the y axis. Optionally, the SMA wires of the SMA actuator 2 are arranged, on contraction, to tilt the movable part 100 relative to the support structure 3 about two first axes that are perpendicular to the primary axis P and that pass through the movable part 100. The first axes may be the x axis and the y axis.

The plurality of SMA wires of the SMA actuator 2 are arranged, on contraction, to translationally move the movable part 100 relative to the support structure 3 perpendicular to the primary axis P. For example, when the movable part 100 is arranged to tilt around the x axis, then the movable part 100 is arranged to translationally move along the y axis. When the movable part 100 is arranged to tilt around the y axis, then the movable part 100 is arranged to translationally move along the x axis. When the movable part 100 is arranged to tilt around the x and y axes, then the movable part 100 is arranged to translationally move along the x and y axes.

The type of drive arrangement which may be included in the SMA actuator 2 may comprise, for example, four SMA wires or eight SMA wires. For example, when eight SMA wires are provided, two of the SMA wires are arranged on each of four sides around the z axis. The two SMA wires on each side are inclined in opposite senses with respect to each other, as viewed perpendicular from the z axis, and cross each other. The four sides on which the SMA wires are arranged extend in a loop around the z axis. In one example, the sides are perpendicular and so form a square as viewed along the z axis, but alternatively the sides could take a different quadrilateral shape. In one example, the SMA wires are parallel to the outer faces of the movable part 100 which conveniently packages the SMA actuation apparatus 1 but is not essential. Examples of such a drive arrangement are described in WO 2011/104518 A1. The description of these drive arrangements, particularly those depicted in FIG. 1, FIG. 2 and FIG. 4 of that document, is incorporated herein by reference.

Optionally, the two SMA wires on each side are connected to the movable part 100 and the support structure 3 to provide forces on the movable part 100 with components in opposite directions along the z axis.

Alternatively, the two SMA wires on each side are connected to the movable part 100 and the support structure 3 to provide a force on the movable part 100 with a component in the same direction along the z axis, this alternating on successive sides. Thus the four SMA wires on opposite sides form a group that provide a force in one direction and the four SMA wires on the other opposite sides form a group that provide a force in the opposite direction.

The actuation apparatus 1 comprises a control circuit electrically connected to the SMA wires for supplying drive signals to the SMA wires. The forces exerted by the SMA wires are controlled by selectively varying the temperatures of the SMA wires. This is achieved by passing selective drive signals through the SMA wires that provide resistive heating. Heating is provided directly by the drive current. Cooling is provided by reducing or ceasing the drive current to allow the SMA wires to cool by conduction, convection and radiation to its surroundings. Further details are also provided in WO 2013/175197 A1, which is incorporated herein by this reference.

In general, the SMA wires are arranged, on contraction, to tilt the movable part 100 relative to the support structure 3 about at least one axis, and preferably two orthogonal axes, perpendicular to the primary axis P of the SMA actuation apparatus 1. The primary axis P is perpendicular to the major surfaces of the movable part 100 (e.g. the light-sensitive surface of the image sensor 6) when the movable part 100 is in its neutral or untilted position with respect to the support structure 3.

Figure 3:
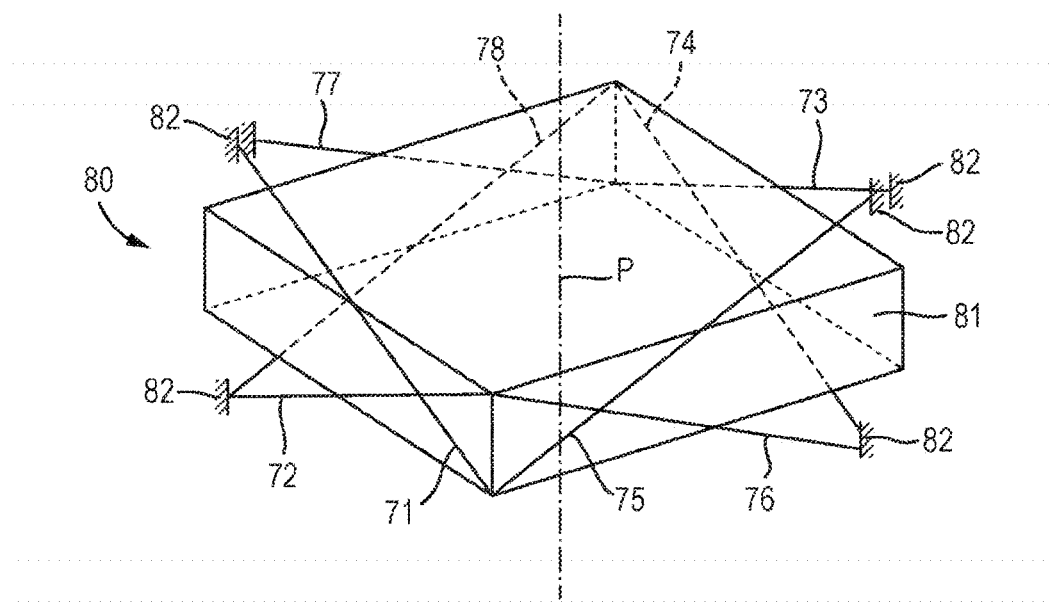
FIG. 3 is a schematic diagram of a comparative SMA actuator arrangement.

FIG. 3 is a schematic diagram of a drive arrangement comprising eight SMA wires. The arrangement shown in FIG. 3 is described to help with understanding of how a movable part may be tilted relative to a support structure about two orthogonal axes.

The arrangement shown in FIG. 3 includes SMA actuator wires 71-78 arranged on each of four perpendicular sides of the primary axis P and connected to the movable element 81 and the support structure 82. Thus, one of the SMA actuator wires 71-78 on each side provides a force on the movable element 81 in the same direction along the primary axis P. In particular, the SMA actuator wires 71, 73, 75, 77 form a group that provide a force in one direction (upwards in FIG. 3) and the other SMA actuator wires 72, 74, 76, 78 form a group that provide a force in the opposite direction (downwards in FIG. 3).

The SMA actuator wires 71-78 have a symmetrical arrangement in which lengths and inclination angles are the same, so that both the group of SMA actuator wires 71, 73, 75, 77 and the group of SMA actuator wires 72, 74, 76, 78 are each arranged with two-fold rotational symmetry about the primary axis P (i.e. bisecting the angle between SMA actuator wires 71-78 on adjacent sides and across the diagonals of the square shape of the movable element). As a result of this symmetrical arrangement, different combinations of the SMA actuator wires 71-78, when selectively actuated are capable of driving movement of the movable element 81 with multiple degrees of freedom, as follows. In general, the SMA wires 71-78 are arranged, on contraction, to tilt the movable element 81 relative to the support structure 82 about two orthogonal axes, perpendicular to the primary axis P.

The group of SMA actuator wires 71, 73, 75, 77 and the group of SMA actuator wires 72, 74, 76, 78 when commonly actuated drive movement along the primary axis P.

Within each group, adjacent pairs of the SMA actuator wires (for example on one hand SMA actuator wires 71, 77 and on the other hand SMA actuator wires 73, 75) when differentially actuated drive tilting about a lateral axis perpendicular to the primary axis P. Tilting in any arbitrary direction may be achieved as a linear combination of tilts about the two lateral axes.

Sets of four SMA actuator wires, including two SMA actuator wires from each group, (for example on one hand SMA actuator wires 71, 72, 77, 78 and on the other hand SMA actuator wires 73-76) when commonly actuated drive movement along a lateral axis perpendicular to the primary axis P. Movement in any arbitrary direction perpendicular to the primary axis P may be achieved as a linear combination of movements along the two lateral axes.

Hence the arrangement shown in FIG. 3 can perform tilting movement or translational movement.

Figure 5:
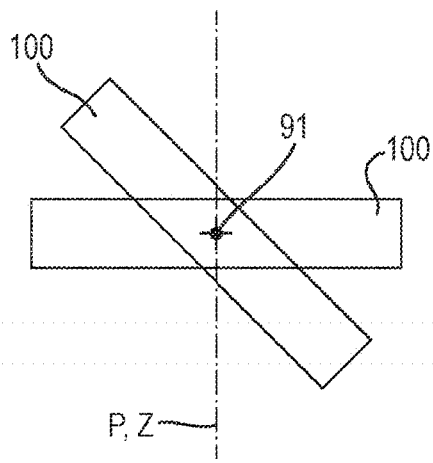
FIG. 5 is a diagram illustrating tilt about a first axis.
Figure 6:
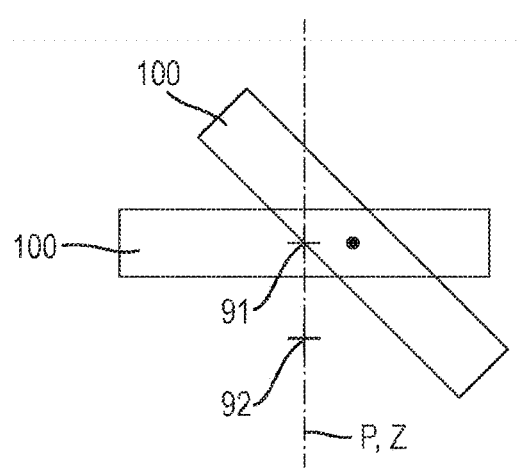
FIG. 6 is a diagram illustrating tilt about a second axis.

The control circuit of the present invention is also capable of performing tilting movement or translational movement. The control circuit of the present invention is further configured to generate drive signals that combine the tilting and the translational movement so as to cause the movable element 100 to tilt about at least one second axis that is perpendicular to the primary axis P and spaced from the first axis. This is explained with reference to FIG. 5 and FIG. 6. FIG. 5 depicts tilting of the movable part 100 about a first axis 91 that is perpendicular to the primary axis P. The arrangement shown in FIG. 3 can perform this type of tilting. FIG. 6 depicts tilting about a second axis 92 that is perpendicular to the primary axis P and spaced from the first axis 91. The tilted position shown in FIG. 6 can be formed from a combination of the tilt shown in FIG. 5 with a translational movement (from left to right going from FIG. 5 to FIG. 6). The control circuit of the present invention is configured to generate drive signals that combine tilting and the translational movement in this manner so as to cause the movable element to tilt about the second axis 92.

The axis of rotation can be moved from the first axis to the second axis by adding a translation to the rotational motion about the first axis. For example, the first axis of rotation for rotational motion about the x axis can be moved along the z axis by adding a translation along the y axis to the rotational motion about the first axis.

The SMA actuator 2 is capable of moving the movable part 100 to have both rotational and translation motion. By adding translation to rotation it is possible to produce rotation about different heights (i.e. the position along the z axis of the axis of rotation can be controlled). For example adding translation in the x direction to rotation about the y axis results in rotation about a vector in the y direction that has a negative (or alternatively positive) position in the z direction. This allows the axis of tilt to be controlled to be at a position where there is less resistance to the tilting motion from other parts of the SMA actuation apparatus 1.

Figure 4:
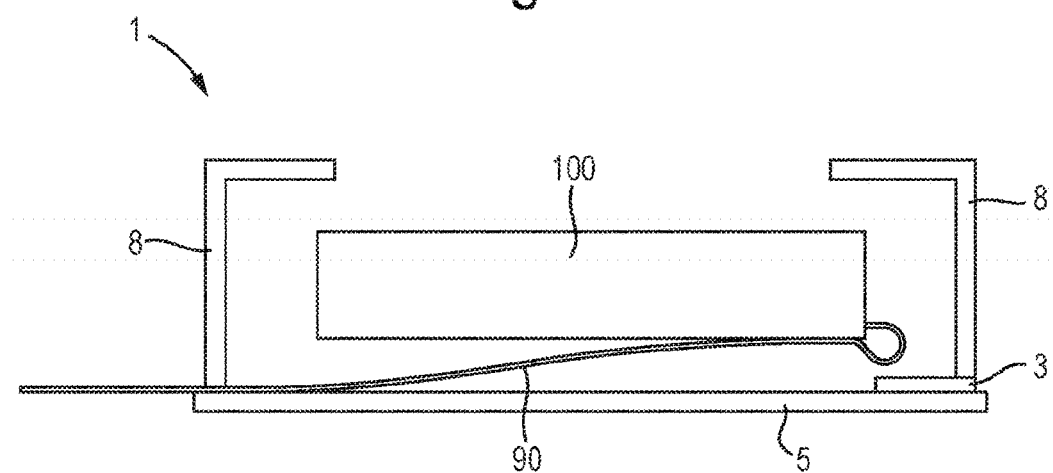
FIG. 4 is a schematic diagram of a component connected to a movable part of an SMA actuation apparatus.

As shown in FIG. 4, the actuation apparatus 1 may comprise a component 90 that is connected at one end to the movable part 100. The component 90 may be connected between the movable part 100 and the support structure 3. For example, the component 90 may be configured to provide an electrical connection from the movable part 100 to the support structure 3 or a part fixedly connected to the support structure 3 (e.g. a printed circuit board). The electrical connection may be for transferring control signals and/or image data. The component 90 may pass between the movable part 100 and the support structure 3, below the movable part 100 with respect to the primary axis P. The component 90 may extend from the movable part in a first direction and then bend around in a second direction which is substantially opposite to the first direction.

The component 90 is configured to be compliant to allow the tilt of the movable part 100 to occur. The component 90 may have some stiffness. The stiffness can provide resistance to the desirable movement of the movable part 100. For example, the component 90 may be a flexible circuit board. The component 90 may allow tilt (or bending of the connection) but resist translation (or extension of the connection).

The component 90 may have a natural axis about which it allows rotation (e.g. an axis about which the component 90 has a low torsional stiffness) and will resist rotation about other axes (e.g. axes about which the component 90 has a high torsional stiffness). In practice the height of this natural axis of rotation may change with the angle of the moving part, may vary form part to part and may vary from one axis to another within a single part. This makes the rotation difficult to control and measure.

Optionally, the control circuit is configured to generate the drive signals such that the second axis intersects with the primary axis P at a position within the axial extent of the component 90 along the primary axis P. Translational movement is combined with the rotational movement so as to produce an effective tilt about an axis closer to the natural axis of the stiff component 90.

The control circuit is configured to generate the drive signals such that the rotational stiffness of the movable part 100 is reduced and optionally minimised. The component 90 may have a centre of stiffness. The component 90 undergoes torque during use of the SMA actuation apparatus 1. A torque does not have a position, but does have a direction. If a torque is applied to an object that is connected to a static portion with a compliant structure then the object will rotate about an axis. Torques in different directions will produce movement about different axes. The "centre of stiffness" of the compliant structure (e.g. the component 90) is the locus of the intersection of these different axes. These axes may not all cross at a single point.

Optionally, the control circuit is configured to generate the drive signals such that the second axis intersects with the primary axis P at an axial position of the centre of stiffness of the component 90 along the primary axis P. When the rotational axis for the tilt substantially coincides with the natural axis of the component, the tilt can be well controlled with little, and possibly minimal, resistance.

Figure 7:
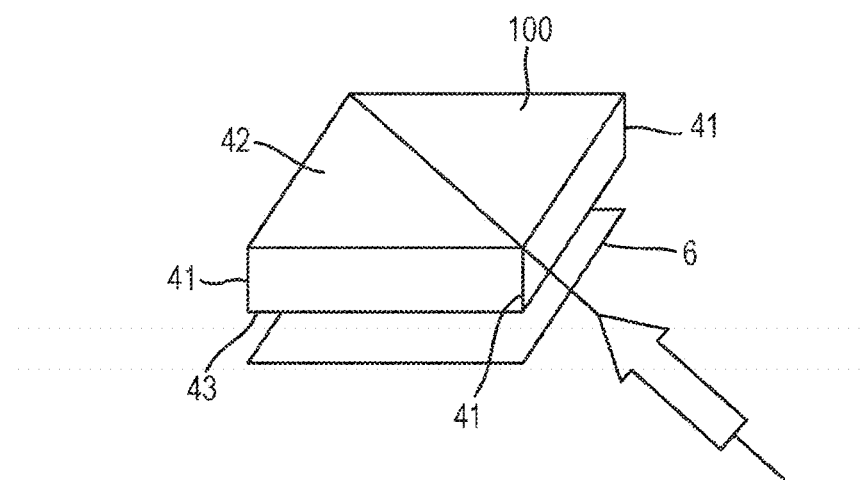
FIG. 7 is a diagram explaining a projection perpendicular to the primary axis.

FIG. 7 is a diagram explaining the view of a projection perpendicular to the primary axis P. The arrow illustrates the direction of viewing the actuation apparatus 1. The view is in the direction of the diagonal of the movable part 100. This is the view of the actuation apparatus 1 shown in FIGS. 8-10. Two of the sides of the actuation apparatus 1 are in view.

Figure 8:
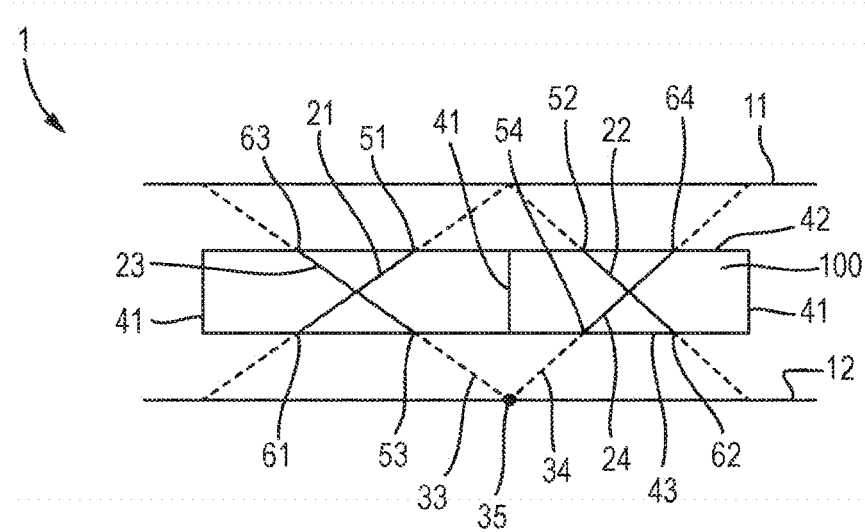
FIG. 8 is a schematic projection view of an SMA actuation apparatus.

FIG. 8 is a schematic view of an actuation apparatus 1, wherein the movable part 100 is in its neutral or untilted position with respect to the support structure 3. The view is along the direction indicated in FIG. 7. The coordinate system shown in FIG. 1, and described in further detail in relation to FIG. 2, applies in the same orientation in FIGS. 8-10. Two sides of the movable part 100 are visible. Each side has two SMA wires associated with it.

As shown in FIG. 8, one side of the movable part 100 has two SMA wires 21, 23 associated with it. Another side of the movable part 100 has two other SMA wires 22, 24 associated with it. Each SMA wire is connected at one end to the movable part 100 and at the other end to the support structure 3. The ends of the SMA wires 21-24 may be attached to the movable part 100 and the support structure 3 by crimps. The crimp positions can be selected depending on the range of movements required.

The SMA wire 21 is connected at one end to the movable part 100 at a movable part connection point 51. This end of the SMA wire 21 may be called the moving end because it is attached to the movable part 100. The other end of the SMA wire 21 is connected to the support structure 3 at a support structure connection point 61. This end of the SMA wire may be called the static end because it is connected to the support structure 3 rather than the movable part 100.

The other SMA wires 22-24 are similarly connected as follows. The SMA wire 22 is connected at its moving end to a movable part connection point 52. The SMA wire 22 is connected at its static end to a support structure connection point 62. The SMA wire 23 is connected at its moving end to a movable part connection point 53. The SMA wire 23 is connected at its static end to a support structure connection point 63. The SMA wire 24 is connected at its moving end to a movable part connection point 54. The SMA wire 24 is connected at its static end to a support structure connection point 64.

As shown in FIG. 8, the moving ends of the SMA wires 21-24 are congregated together at an edge 41 of the movable part 100. The edge 41 is the join between the two sides of the movable part 100. The static ends of the SMA wires 21-24 may be congregated together at other edges 41 of the movable part 100.

As shown in FIG. 8, optionally the plurality of SMA wires 21-24 comprises one or more first pairs of SMA wires in which the two SMA wires are oppositely inclined with respect to the primary axis P. For example the SMA wires 21, 22 form a first pair of wires oppositely inclined with respect to the primary axis P. The SMA wires 23, 24 form a first pair of wires oppositely inclined with respect to the primary axis P. When the SMA wires 23, 24 are contracted at the same time, then the edge 41 between them is forced in the +Z direction.

The arrangement of the SMA wires 21-24 affects the range of motions possible by the movable part 100. The movement of the movable part 100 in each direction is limited. The movement may be limited by end stops. End stops are components designed to prevent the movable part 100 from moving to a position that would result in an SMA wire being overstretched and therefore potentially damaged. This is particularly the case when the actuation apparatus 1 undergoes a drop event. End stops may also be provided to prevent motion that is undesirable.

The movement of the movable part 100 may also be limited by wire limits. In other words the SMA wires 21-24 can only strain a certain amount. When the axis of rotation for the tilt motions of the movable part 100 are moved by the addition of a translational motion (as described above), the SMA wires 21-24 may be required to strain more in order for the movable part 100 to be tilted by a given tilt angle.

The movable part 100 may be designed such that tilt about the X axis and/or the Y axis is possible over a range of tilt angles. The ends of the range of possible tilt angles may be called tilt limits. For example, the movable part 100 may be configured to tilt by at least 1°, optionally at least 2°, optionally at least 5° and optionally at least 10° in both directions of tilt.

When the axis of tilt rotation is moved, there is a possibility that the full range of tilt can no longer be achieved because of the strain limits of the SMA wires 21-24. It is desirable to ensure that the second axis is not positioned so far from the first axis that the strain limits of the SMA wires 21-24 limit the range of tilt of the movable part 100. It is desirable to increase the range of positions for second axis while ensuring that the strain limits of the SMA wires 21-24 do not limit the tilt of the movable part 100.

In FIG. 8, an upper limit plane 11 and a lower limit plane 12 are shown. The limit planes 11, 12 define the range of possible positions along the Z axis for the second axis while ensuring that the strain limits of the SMA wires 21-24 do not prevent the full range of intended tilt of the movable part 4. If the second axis is positioned above the upper limit plane 11, then the maximum tilt angles could not be achieved because of the limit of how much the SMA wires can be strained. Similarly, if the second axis is positioned below the lower limit plane 12, then the maximum tilt angles could not be achieved because of the limit of how much the SMA wires can be strained. This is how the limit planes 11, 12 shown in FIG. 8 are defined.

When driving to wire limits in tilt, the axis of rotation (i.e. the second axis) can lie on any plane on or between the lower limit plane 12 and the upper limit plane 11. If the SMA actuator 2 is made to rotate the movable part 100 about an axis outside of this range there will not be sufficient translational movement available to allow all the potential rotation to be used.

The movable part 100 can tilt relative to the support structure 3 about the first axis between tilt limits defining maximum tilt angles about the first axis. Desirably, the movable part 100 can tilt relative to the support structure 3 about the second axis between tilt limits defining the same maximum tilt angles about the second axis. There is no loss of tilt range when the tilt rotation axis is moved by the addition of the translational movement.

The orientation of the SMA wires 21-24 affects the positions of the limit planes 11, 12. As shown in FIG. 8, the first pair of SMA wires 23, 24 do not cross each other and their moving ends do not meet. The movable part connection points 53, 54 are distanced from each other in the direction perpendicular to the primary axis.

FIG. 8 shows in dashed lines the imaginary linear continuations 33, 34 of the SMA wires 23, 24. As shown in FIG. 8, the first pair of SMA wires 23, 24 may be arranged such that an imaginary point of intersection 35 between the imaginary linear continuations 33, 34 of the two SMA wires 23, 24 beyond where they are attached to the movable part 100 along a projection perpendicular to the primary axis P (i.e. the view of FIG. 8) is beyond the axial extent of the two SMA wires 23, 24 along the primary axis P. The axial extent of the two SMA wires 23, 24 along the primary axis P runs from their movable part connection points 53, 54 to their support structure connection points 63, 64. The imaginary point of intersection 35 is beyond the movable part connection points 53, 54 in the −Z direction.

The position of the imaginary point of intersection 35 roughly coincides with the lower limit plane 12. By changing the angles of the SMA wires 23, 24 with respect to the primary axis P, the position of the lower limit plane 12 can be controlled. This allows the lower limit plane 12 to be distanced from the lower surface 43 of the movable part 100. Similarly, the position of an imaginary point of intersection of imaginary linear continuations of the SMA wires 21, 22 (shown in FIG. 10) approximately defines the position of the upper limit plane 11. This allows the upper limit plane 11 to be distanced from the upper surface 42 of the movable part 100.

Optionally, the stiff component 90 mentioned above, which may be the electrical interconnect 90, may be placed below the SMA actuator 2, i.e. in the −Z direction relative to the SMA wires 21-24. In order to enable rotation around axes lying in the plane in which the interconnect sits and to enable the full rotation capability of the SMA actuator 2 to be realised, the SMA wires 21-24 do not extend to the edges 41. The movable part connection points 51-54 are substantially distanced from the edge 41 of the movable part 100.

In this wire arrangement, the axis of rotation (i.e. the second axis) can lie on any plane on or between the lower limit plane 12 and the upper limit plane 11. This enables rotations about the interconnect 90 to be accommodated by the design while still achieving the full tilt allowed by the SMA wires 21-24.

The control circuit may be configured to generate the drive signals such that the second axis intersects with the primary axis P at a position beyond the axial extent of where the SMA wires 21-24 are attached to the movable part 100 along the primary axis P. The imaginary point of intersection 35 may be beyond the axial extent of all of the SMA wires 21-24 along the primary axis P. As shown in FIG. 8, the lower limit plane 12 is axially spaced from the movable part connection points 53, 54. The second axis may be positioned in the axial space between the lower limit plane 12 and the movable part connection points 53, 54. This may be where the stiff component 90 is located.

The control circuit may be configured to generate the drive signals such that the second axis intersects with the primary axis P at a position beyond the axial extent of the movable part 100 along the primary axis P. The imaginary point of intersection 35 may be beyond the axial extent of the movable part 100 along the primary axis P. As shown in FIG. 8, the lower limit plane 12 is axially spaced from the movable part 100. The second axis may be positioned in the axial space between the lower limit plane 12 and the movable part 100. This may be where the stiff component 90 is located. The imaginary point of intersection 35 may be within the axial extent of the component 90 along the primary axis P. Alternatively, the component 90 may be between the movable part 100 and the imaginary point of intersection 35 along the primary axis P.

Although not fully shown in FIG. 8, the plurality of SMA wires may comprise one or more second pairs of SMA wires in which the two SMA wires are oppositely inclined with respect to the primary axis P. FIG. 8 shows only two of the sides of the movable part 100. There are further sides which connect at the edges 41 but are not shown in FIG. 8. The SMA wire 21 forms a second pair of SMA wires with another SMA wire on a side adjacent to the side associated with the SMA wire 21 (this other SMA wire is not shown in FIG. 8). The SMA wire 22 forms a second pair of SMA wires with another SMA wire on a side adjacent to the side associated with the SMA wire 22 (this other SMA wire is not shown in FIG. 8). The two SMA wires of each second pair are arranged such that an imaginary point of intersection between imaginary linear continuations of the two SMA wires beyond where they are attached to the support structure 3 along a projection perpendicular to the primary axis P is beyond the axial extent of the two SMA wires along the primary axis P. FIG. 8 shows the imaginary linear continuations of the SMA wires 21, 22.

The SMA wires 21, 22 do not extend to the edges 41. The support structure connection points 61, 62 are substantially distanced from the edges 41 of the movable part 100. Optionally, the stiff component 90 mentioned above, which may be the electrical interconnect 90, may be placed below the SMA actuator 2, i.e. in the −Z direction relative to the SMA wires 21, 22. The component 90 can be positioned below the movable part 100 without any potential interference from the support structure connection points 61, 62. This improves the design freedom for the stiff component 90, for example how the electrical interconnect 90 connects to the movable part 100.

The imaginary point of intersection between imaginary linear continuations of the two SMA wires beyond where they are attached to the support structure 3 may be beyond the axial extent of all of the SMA wires 21-24 along the primary axis P. The imaginary point of intersection between imaginary linear continuations of the two SMA wires beyond where they are attached to the support structure 3 may be beyond the axial extent of the movable part 100 along the primary axis P. The imaginary point of intersection between imaginary linear continuations of the two SMA wires beyond where they are attached to the support structure 3 may be within the axial extent of the component 90 along the primary axis P.

Figure 9:
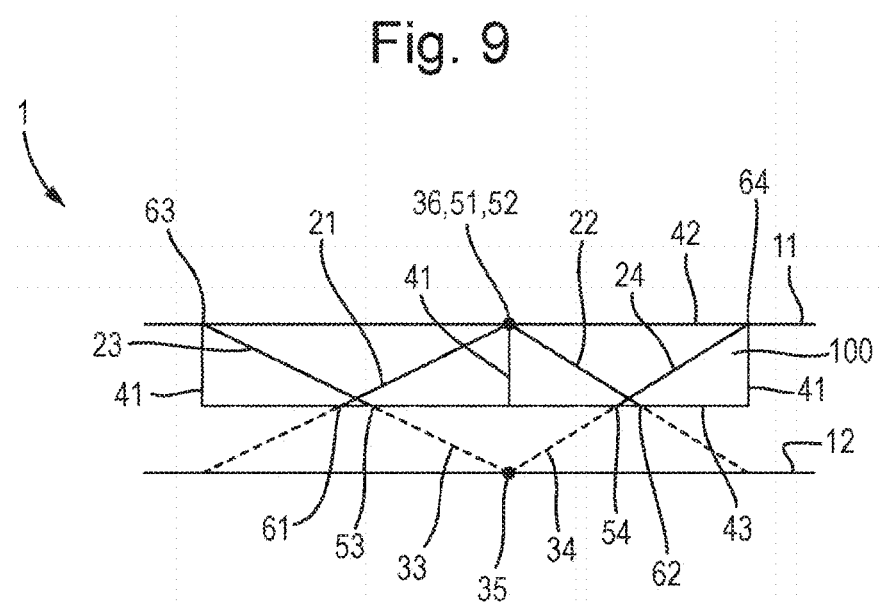
FIG. 9 is a schematic projection view of an SMA actuation apparatus.

FIG. 9 is a schematic view of an actuation apparatus 1, wherein the movable part 100 is in the neutral or untilted position with respect to the support structure 3. The view is along the direction indicated in FIG. 7. Two sides of the movable part 100 are visible. Each side has two SMA wires associated with it.

FIG. 9 shows a different arrangement of SMA wires 21-24 from the arrangement shown in FIG. 8. Features that are the same as those shown in FIG. 8 are not described again.

As shown in FIG. 9, the moving ends of the SMA wires 21, 22 extend to the edges 41 of the sides of the movable part 100. The plurality of SMA wires 21-24 may comprise one or more third pairs of SMA wires 21, 22 in which the two SMA wires 21, 22 are oppositely inclined with respect to the primary axis P. The SMA wires 21, 22 together form a third pair of SMA wires. The SMA wires 21, 22 of the third pair are arranged such that a point of intersection 36 between lines along which the two SMA wires lie along a projection perpendicular to the primary axis P is within the axial extent of the two SMA wires 21, 22 along the primary axis P. The point of intersection 36 is at the opposite axial end of the movable part 100 along the primary axis P relative to the imaginary point 35 associated with the one or more first pairs of SMA wires. The point of intersection 36 may be substantially at the same position as the movable part connection points 51, 52 for the SMA wires 21, 22 of the third pair.

The stiff component 90, which may be the interconnect 90, may be placed below the SMA wires 21-24. In order to enable rotation around axes lying in the plane in which the interconnect sits and to enable the full rotation capability of the actuator to be realised, the lower ends of the SMA wires 21-24 do not extend to the edges 41, as shown in FIG. 9. However, the upper ends of the SMA wires 21-24 may extend to the edges 41. As explained above, the movable part connection points 51, 52 of the SMA wires 21, 22 may reach the corners. Optionally, the support structure connection points 63, 64 of the SMA wires 23, 24 of the first pair reach the edges 41 of the sides of the movable part 100. This allows the SMA wires 21-24 to be longer compared to the arrangement shown in FIG. 8. Longer SMA wires are desirable for allowing greater movement of the movable part 100.

In the wire arrangement shown in FIG. 9, the axis of rotation (i.e. the second axis) can lie on any plane on or between the upper limit plane 11 and the lower limit plane 12. This enables rotations about the interconnect 90 to be accommodated by the design while still achieving the full tilt allowed by the wires. In addition the wire length is longer that it is in the arrangement sown in FIG. 8, allowing a larger wire strain to be utilised.

Figure 10:
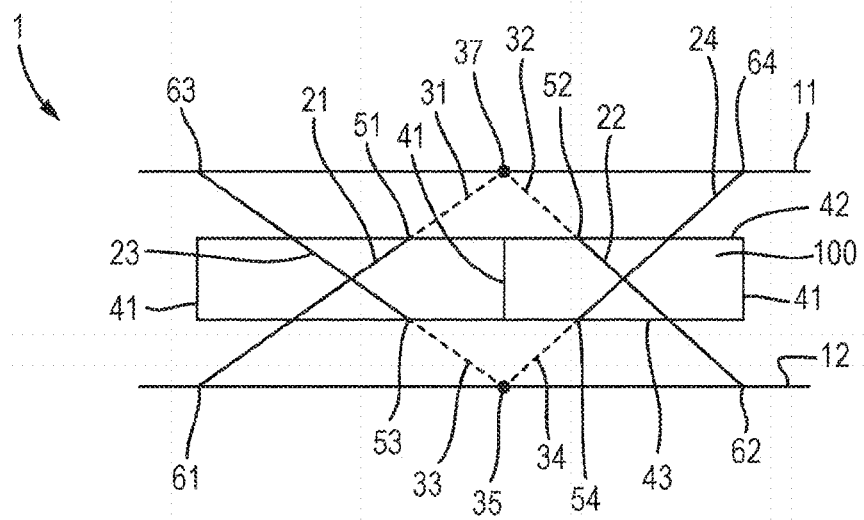
FIG. 10 is a schematic projection view of an SMA actuation apparatus.

FIG. 10 is a schematic view of an actuation apparatus 1, wherein the movable part 100 is in the neutral or untilted position with respect to the support structure 3. The view is along the direction indicated in FIG. 7. Two sides of the movable part 100 are visible. Each side has two SMA wires associated with it.

FIG. 10 shows a different arrangement of SMA wires 21-24 from the arrangement shown in FIG. 8. Features that are the same as those shown in FIG. 8 are not described again.

As shown in FIG. 10, the moving ends of the SMA wires 21-24 do not extend to the edges 41 of the sides of the movable part 100. This is similar to as shown in FIG. 8. However, the static ends of the SMA wires 21-24 (i.e. the ends connected to the support structure 3) are aligned with the edges 41. The support structure connection points 61-64 are substantially aligned with the edges 41 of the movable part 100.

The interconnect 90 may be positioned below the movable part 100. The moving ends of the wires do not extend to the edge 41 so that the movable part 100 is able to tilt about an axis of rotation extending through the component 90.

As shown in FIG. 10, the SMA wires 21-24 may be attached to the support structure 3 at positions that are substantially beyond the axial extent of the movable part 100 along the primary axis P, at least when the movable part 100 is in its neutral or untilted position with respect to the support structure 3. When the movable part 100 is tilted, it is possible that at least one of the support structure connection points 61-64 comes within the axial extent of the movable part 100. By providing the static ends substantially beyond the movable part 100, the length of the SMA wires 21-24 can be desirably increased.

As shown in FIG. 10, in an embodiment the imaginary linear continuations 31, 32 of the SMA wires 21, 22 meet at an imaginary intersection 37 substantially beyond the axial extent of the movable part 100. This feature is also present in the arrangement shown in FIG. 8. This allows the upper limit plane 11 to be substantially distanced from the upper surface 42 of the movable part 100.

The control circuit may be configured to generate the drive signals so as to control a position at which the second axis intersects with the primary axis P during use of the SMA actuation apparatus 1. The tilt rotation axis may be moved on-the-fly. In practice the height of the natural axis of rotation of the stiff component may change with the angle of the moving part 100 and/or may vary from one axis to another within a single part. By controlling the position of the second axis during use, the varying position of the natural axis can be accounted for. The second axis can be controlled to remain close to the centre of stiffness of the component as the angle of the movable part 100 changes and the centre of stiffness moves.

The control circuit may be configured to generate the drive signals to control the tilt angle of the movable part 100 about the second axis based on a calculation of the current tilt angle and a target tilt angle. The current tilt angle may be sent to the control circuit. The current tilt angle may be indicated by data transferred through the interconnect 90. The current tilt angle may be indicated by the drive signals that are used to control the orientation of the movable part 100. The control circuit may be configured to determine the required translational movement to be added to the rotation about the first axis in order to effect the rotation about the second axis.

The control circuit may be configured to generate the drive signals to control the tilt angle and the lateral position of the movable part based on a calculation of the current tilt angle, a calculation of the current lateral position, a target tilt angle and a target lateral position. The drive circuit may take into account the current lateral position and drive the movable part 100 to the target lateral position. Both the lateral position and the tilt angle may be simultaneously actively controlled by the drive circuit. This may increase the accuracy of the position and orientation of the movable part 100.

Alternatively, the control circuit may be configured to generate the drive signals to control the tilt angle of the movable part 100 based on a calculation of the current tilt angle and a target tilt angle, while allowing the lateral position of the movable part 100 to be passively determined. The height of the second axis may be adjusted by allowing the component 90 to self-adjust the translational movements of the movable part 100.

There may be significant part-to-part variation in the position of the axis of the rotation allowed by the component 90. Optionally, the control circuit is configured to control the length of the SMA wires 21-24 so as to control the rotation of the movable part 100 about the first axis. However, the position of the movable part 100 in the directions perpendicular to the primary axis P may be allowed to vary without active control. In this way the height of the second axis may be partially controlled by the stiff component 90 while still maintaining accurate control of the tilt angle through which the movable part 100 is rotated. This may simplify the process of controlling the movements of the movable part 100.

Various modifications may be made to the specific examples described above. For example, as mentioned above, the actuator arrangement that moves the movable part 100 relative to the support structure 3 may comprise SMA wires. However, the actuator arrangement may be of other types, for example comprising a voice coil motor (VCM). As another example, as mentioned above, the movable part 100 may comprise both the lens assembly 4 and the image sensor 6. Alternatively, the image sensor 6 may be provided separately from the movable part 100. For example, the SMA actuation apparatus 1 may be a camera apparatus comprising an image sensor 6 fixed to the support structure 3, and the movable part comprises a camera lens element such as a lens assembly 4 arranged to focus an image on the image sensor 6. The lens assembly 4 may be tilted relative to the stationary image sensor 6 in order to compensate for camera shake. Alternatively, the movable part may comprise the image sensor 6 and not the lens assembly 4.

Any of the embodiments described herein in the context of a camera apparatus in which an image sensor and/or lens assembly is moved may be applied to any movable part comprising an electronic component (e.g. a display, an emitter, or a part thereof) which is to be moved with respect to a support structure.

Where the movable part comprises an emitter or a display (or a part thereof), the movable part may be moved to achieve wobulation, for example for the display of a super-resolution image (i.e. an image having a resolution higher than that of the intrinsic resolution of the emitter or display). In this case, a high-resolution image is displayed (or projected) by displaying a number of lower-resolution images at different positions in rapid succession. The image displayed at each position is a lower-resolution image formed of a subset of pixels of the high-resolution image. The movable part may be moved between the positions in a repeated pattern at a high frequency, for example greater than 30 Hz, preferably greater than 60 Hz, further preferably greater than 120 Hz. The succession of lower-resolution images is thus perceived by the human eye as one high-resolution image.

The display may be a display panel, for example a LCOS (liquid crystal on silicon) display, a MicroLED display, a digital micromirror device (DMD) or a laser beam scanning (LBS) system.

In the case the movable part comprises an emitter, the emitter may be configured to emit radiation (visible light or non-visible radiation, e.g. near infrared (NIR) light, short-wave infrared (SWIR) light). The emitter may comprise one or more LEDs or lasers, for example VCSELs (vertical-cavity surface-emitting lasers) or edge-emitting lasers. The emitter may comprise a VCSEL array. The emitter may otherwise be referred to as an illumination source and/or may comprise an image projector.

In the case that the movable part comprises a display, the display may define a plane and the primary axis may be perpendicular to the plane defined by the display. In any case, the primary axis may be aligned with a general direction in which light is emitted from the display. In the case that the movable part comprises an emitter, the emitter may define a plane and the primary axis may be perpendicular to the plane defined by the emitter. For example, the emitter may comprise a VCSEL array and the primary axis may be perpendicular to the plane of the VCSEL array. In any case, the primary axis may be aligned with a general direction in which radiation is emitted by the emitter.

The invention claimed is:

1. A shape memory alloy (SMA) actuation apparatus comprising:
a movable part;
a support structure;
a plurality of SMA wires arranged, on contraction, to (a) tilt the movable part relative to the support structure about at least one first axis that is perpendicular to a primary axis and that passes through the movable part, and (b) translationally move the movable part relative to the support structure perpendicular to the primary axis, wherein the primary axis is defined with reference to the support structure; and
a control circuit electrically connected to the SMA wires for supplying drive signals thereto,
wherein the control circuit is configured to generate drive signals that combine the tilting and the translational movement to cause the movable part to tilt about at least one second axis that is perpendicular to the primary axis and spaced from the at least one first axis; and
wherein the movable part comprises an electronic component.

2. The SMA actuation apparatus of claim 1 comprising:
a component connected at one end to the movable part and passing between the movable part and the support structure, below the movable part with respect to the primary axis.

3. The SMA actuation apparatus of claim 2, wherein the component extends from the movable part in a first direction and then bends around to extend in a second direction at least substantially opposite to the first direction.

4. The SMA actuation apparatus of claim 2, wherein the control circuit is configured to generate the drive signals such that the at least one second axis intersects with the primary axis at a position within the axial extent of the component along the primary axis.

5. The SMA actuation apparatus of claim 2, wherein the component has a centre of stiffness and the control circuit is configured to generate the drive signals such that the at least one second axis intersects with the primary axis at an axial position of the centre of stiffness of the component along the primary axis.

6. The SMA actuation apparatus of claim 1, wherein the control circuit is configured to generate the drive signals such that the at least one second axis intersects with the primary axis at a position that is at least one of (a) beyond the axial extent of where the SMA wires are attached to the movable part along the primary axis or (b) beyond the axial extent of the movable part along the primary axis.

7. The SMA actuation apparatus of claim 1, configured such that:
the movable part can tilt relative to the support structure about the at least one first axis between tilt limits defining maximum tilt angles about the at least one first axis; and
the movable part can tilt relative to the support structure about the at least one second axis between tilt limits defining the same maximum tilt angles about the at least one second axis.

8. The SMA actuation apparatus of claim 1, wherein the control circuit is configured to generate the drive signals to control a position at which the at least one second axis intersects with the primary axis during use of the SMA actuation apparatus.

9. The SMA actuation apparatus of claim 1, wherein the plurality of SMA wires comprises one or more first pairs of SMA wires in which the two SMA wires of a pair of the one or more first pairs of SMA wires are oppositely inclined with respect to the primary axis and are arranged such that an imaginary point of intersection between imaginary linear continuations of the two SMA wires beyond where they are attached to the movable part along a projection perpendicular to the primary axis is beyond the axial extent of the two SMA wires along the primary axis.

10. The SMA actuation apparatus of claim 9, wherein the imaginary point of intersection is beyond the axial extent of the movable part along the primary axis.

11. The SMA actuation apparatus of claim 9, comprising a component connected at one end to the movable part and passing between the movable part and the support structure, below the movable part with respect to the primary axis, wherein:
the imaginary point of intersection is within the axial extent of the component along the primary axis; or
the component is between the movable part and the imaginary point of intersection along the primary axis.

12. The SMA actuation apparatus of claim 9, wherein the imaginary point of intersection is beyond the axial extent of all of the SMA wires along the primary axis.

13. The SMA actuation apparatus of claim 9, wherein the plurality of SMA wires comprises one or more second pairs of SMA wires in which the two SMA wires are oppositely inclined with respect to the primary axis and are arranged such that an imaginary point of intersection between imaginary linear continuations of the two SMA wires beyond where they are attached to the support structure along a projection perpendicular to the primary axis is beyond the axial extent of the two SMA wires along the primary axis.

14. The SMA actuation apparatus of claim 9, wherein the plurality of SMA wires comprises one or more third pairs of SMA wires in which the two SMA wires are oppositely inclined with respect to the primary axis and are arranged such that a point of intersection between lines along which the two SMA wires lie along a projection perpendicular to the primary axis is within the axial extent of the two SMA wires along the primary axis, the point of intersection being at the opposite axial end of the movable part along the primary axis relative to the imaginary point associated with the one or more first pairs of SMA wires.

15. The SMA actuation apparatus of claim 1, wherein the SMA wires are attached to the support structure at positions that are beyond the axial extent of the movable part along the primary axis.

16. The SMA actuation apparatus of claim 1, wherein the control circuit is configured to generate the drive signals to control the tilt angle of the movable part about the at least one second axis based on a calculation of the current tilt angle and a target tilt angle.

17. The SMA actuation apparatus of claim 16, wherein the control circuit is configured to generate the drive signals to control the tilt angle and the lateral position of the movable part based on a calculation of the current tilt angle, a calculation of the current lateral position, a target tilt angle, and a target lateral position.

18. The SMA actuation apparatus of claim 16, wherein the control circuit is configured to generate the drive signals to control the tilt angle of the movable part based on a calculation of the current tilt angle and a target tilt angle, while allowing the lateral position of the movable part to be passively determined.

19. The SMA actuation apparatus of claim 1, wherein the plurality of SMA wires comprises eight SMA wires inclined with respect to the primary axis with two SMA wires on each of four sides around the primary axis.

20. The SMA actuation apparatus of claim 1, wherein the electronic component comprises an image sensor and the movable component is a camera module comprising the image sensor and a lens assembly arranged to focus an image on the image sensor.

21. The SMA actuation apparatus of claim 1, wherein the electronic component comprises a display or an emitter, and the primary axis is parallel to a general direction in which the display or emitter emits light.

\* \* \* \* \*